(12) United States Patent
Tang et al.

(10) Patent No.: US 8,600,108 B2
(45) Date of Patent: Dec. 3, 2013

(54) DATA PROCESSING SYSTEM AND METHOD

(75) Inventors: Liang Tang, Beijing (CN); Shan-Qing Li, Beijing (CN); Lei Wang, Beijing (CN); Ke-Yan Liu, Beijing (CN); Wei Liu, Beijing (CN)

(73) Assignee: Hewlett-Packard Development Compant, L.P., Houston, TX (US)

( * ) Notice: Subject to any disclaimer, the term of this patent is extended or adjusted under 35 U.S.C. 154(b) by 0 days.

(21) Appl. No.: 13/258,495

(22) PCT Filed: Jan. 25, 2010

(86) PCT No.: PCT/CN2010/070347
§ 371 (c)(1),
(2), (4) Date: Sep. 22, 2011

(87) PCT Pub. No.: WO2011/088624
PCT Pub. Date: Jul. 28, 2011

(65) Prior Publication Data
US 2012/0117084 A1 May 10, 2012

(51) Int. Cl.
*G06K 9/00* (2006.01)
(52) U.S. Cl.
USPC ........... 382/103; 382/162; 382/168; 382/181; 707/736
(58) Field of Classification Search
None
See application file for complete search history.

(56) References Cited

U.S. PATENT DOCUMENTS

| | | | |
|---|---|---|---|
| 8,351,649 B1* | 1/2013 | Medioni et al. | 382/103 |
| 2005/0147303 A1* | 7/2005 | Zhou et al. | 382/190 |
| 2008/0205750 A1* | 8/2008 | Porikli et al. | 382/159 |
| 2008/0240497 A1* | 10/2008 | Porikli et al. | 382/103 |
| 2008/0240499 A1* | 10/2008 | Porikli et al. | 382/103 |
| 2009/0147992 A1* | 6/2009 | Tong et al. | 382/103 |
| 2009/0324008 A1* | 12/2009 | Kongqiao et al. | 382/103 |
| 2010/0195870 A1* | 8/2010 | Ai et al. | 382/103 |
| 2011/0026770 A1* | 2/2011 | Brookshire | 382/103 |

FOREIGN PATENT DOCUMENTS

| | | |
|---|---|---|
| CN | 101221623 | 7/2008 |
| CN | 101295405 | 10/2008 |

OTHER PUBLICATIONS

Breitenstein et al, "Robust Tracking-by-Detection using a Detector Confidence Particle Filter", 2009.*
Cao et al, "Linear SVM Classification Using Boosting Hog Features for Vehicle Detection in Low-altitude Airborne Videos", IEEE, Apr. 2011.*
Shen et al, "Probabilistic Multiple Cue Integration for Particle Filter Based Tracking", 2003.*
Takeuchi et al, "On-road Vehicle Tracking Using Deformable Object Model and Particle Filter with Integrated Likelihoods", IEEE, Jun. 2010.*

(Continued)

*Primary Examiner* — Hung Le

(57) ABSTRACT

Embodiments of the present invention relate to a data processing method comprising the steps of processing a first sample set associated with first results of tracking a target in a number of image frames using a first object classifier arranged to operate according to a first feature and processing a second sample set associated with second results of tracking the target in said number of image frames using a second object classifier arrange to operate according to a second feature, and using at least one of the first and second tracking results to influence at least one particle filter adapted to influence at least one of subsequent first and second tracking results.

23 Claims, 12 Drawing Sheets

(56) References Cited

OTHER PUBLICATIONS

Zeng et al, "Robust Head-shoulder Detection by PCA-Based Multi-level HOG-LBP Detector for People Counting", 2010, pp. 2069-2072.*

Zhu et al, "Automatic Multi-player Detection and Tracking in Broadcast Sports Video Using Support Vector Machine and Particle Filter", 2006.*

Jin et al, "Online Real Adaboost with Co-training for Object Tracking", 2009.*

Li et al, "Tracking in Low Frame Rate Video: A Cascade Particle Filter with Discriminative Observers of Different Lifespans", IEEE, 2007.*

Liu, Guixi et al. Visual Object Tracking Based on Particle Filter and Multiple Cues, Journal of optoelectronics laser. Sep. 2007. vol. 18, No. 9, pp. 1108-1111.

Tang, Feng et al al, Co-Tracking Using Semi-Supervised Support Vector Machines, Computer Vision, 2007, ICCV 2007, IEEE 11th International Conference on Digital Object Identifier pp. 1-8.

Wang, Xiaoyu et al. An HOG-LBP Human Detector with Partial Occlusion Handling. 2009 IEEE 12th, International Conference on Computer Vision (ICCV), 2009, pp. 32-39.

Xu, Yihua et aJ. A Vision-Based Method for Finger-Screen Interaction. ACfA Electronica Sinica. Nov. 2007, vol. 35, No. 11, pp. 2236-2240.

* cited by examiner

Figure 10
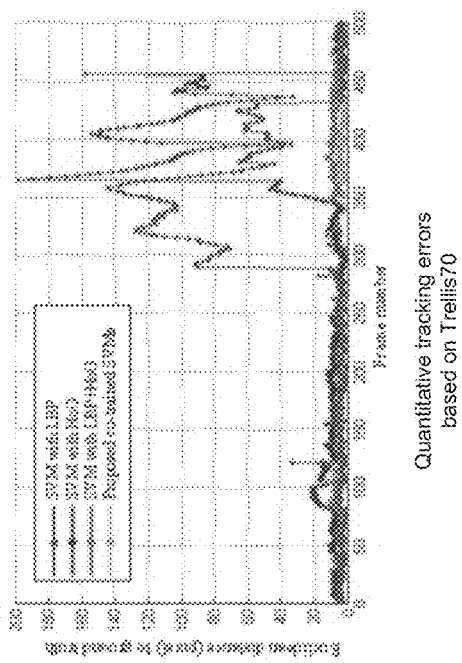
Quantitative tracking errors based on Trellis70
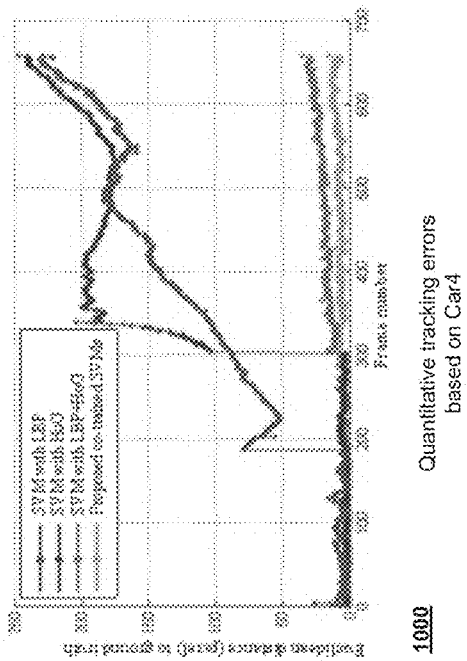
Quantitative tracking errors based on Car4
1000

Figure 11

| Dataset | Statistical error | SVM with LBP | SVM with HoG | Single SVM with LBP+HoG | Co-trained SVM with LBP+HoG |
|---|---|---|---|---|---|
| Trellis70 | Mean absolute error | 26.612 | 27.104 | 6.071 | 4.609 |
| | Standard error | 39.882 | 41.268 | 1.981 | 2.002 |
| Car4 | Mean absolute error | 100.303 | 102.516 | 12.234 | 5.930 |
| | Standard error | 72.311 | 93.786 | 9.077 | 3.107 |

1100

DATA PROCESSING SYSTEM AND METHOD

Embodiments of the present invention relate to a data processing system and method.

In the field of data processing, more particularly, image processing, often objects are identified and tracked by multiple cameras as they traverse the respective fields of view of those cameras. It will be appreciated that the problem of such image processing and, in particular, such tracking of an object is exacerbated by variations in background and against a cluttered background.

Tracking algorithms are known that adopt object classifiers to locate objects among visual observations or data. A classifier can operate in at least one of two ways; namely, generatively using a generative model or discriminatively using a discriminative model. Generative tracking trains a model to represent the appearance of an object without considering information from backgrounds, and have the disadvantage that offline training cannot benefit from new knowledge or data acquired during tracking, which can result in tracking failures. Therefore, online trained discriminative classifiers are more attractive for robust tracking due to the ability to process information from both the foreground and background and to update models in real-time or on-line. However, such an approach has the disadvantage of self-training if the classification results are used to update the classifier itself.

BRIEF DESCRIPTION OF THE DRAWINGS

Embodiments of the present invention will now be described, by way of example, only, with reference to the accompanying drawings in which:

FIG. 10 depicts a pair of graphs showing quantitative comparisons between embodiments of the present invention and two self-training methods using the Trellis70 and Car4 benchmarks;

FIG. 11 shows a mean absolute error and standard error for distance values from tracked objects to manually labeled ground truth.

DESCRIPTION OF EMBODIMENTS

Figure 1:
FIG. 1 shows an image plane comprising a tracked object.

Embodiments of the invention provide a data processing method comprising the steps of processing a first sample set associated with first results of tracking a target in a number of image frames using a first object classifier arranged to operate according to a first feature and processing a second sample set associated with second results of tracking the target in said number of image frames using a second object classifier arrange to operate according to a second feature, and using at least one of the first and second tracking results to influence at least one particle filter adapted to influence at least one of subsequent first and second tracking results.

Advantageously, embodiments of the present invention support tracking of objects using a combination of co-training and particle filtering. One skilled in the art appreciates that tracking results are obtained by combining object confidence from online co-trained classifiers and dynamic prediction from particle filters. This combination of posterior probability and spatial-temporal consistency improves accuracy and robustness of the tracking system.

Embodiments provide a data processing method wherein the step of using at least one of the first and second tracking results to influence at least one particle filter adapted to influence at least one of subsequent first and second tracking results comprises weighting the tracking the at least one of said first and second tracking results.

Embodiments provide a data processing method wherein said at least one particle filter is adapted to influence spatial-temporal consistency of the at least one of the first and second tracking results.

Embodiments provide a method in which said first and second features are at least two or more of linear binary patterns, histogram of gradients, histogram of colour, Haar wavelets taken in any and all combinations.

Embodiments provide a method in which the first and second features are linear binary patters and a histogram of gradients.

Embodiments provide a method in which the first tracking results comprise negative tracking results associated with the second object classifier and the second tracking results comprise negative tracking results of the first object classifier.

Embodiments provide a method wherein the negative tracking results associated with the second object classifier comprise K ranked results and exclude positive tracking results and the negative tracking results associated with the first object classifier comprise K ranked results and exclude positive tracking results.

Embodiments provide a method in which the first tracking results comprise positive tracking results associated with the first object classifier and the second tracking results comprise positive results associated with the second object classifier.

Embodiments provide a data processing system comprising a first object classifier adapted to process a first sample set associated with first results of tracking a target in a number of image frames; said first object classifier being arranged to operate according to a first feature and a second object classifier adapted to process a second sample set associated with second results of tracking the target in said number of image frames; said second object classifier being arrange to operate according to a second feature, and at least one particle filter responsive to at least one of the first and second tracking; said at least one particle filter being adapted to influence at least one of subsequent first and second tracking results.

Embodiments provide such a system wherein said at least one particle filter being responsive to said at least one of the first and second tracking results to influence at least one of subsequent first and second tracking results comprises a weighting unit adapted to weight the tracking the at least one of said first and second tracking results.

Embodiments provide such a system wherein said at least one particle filter is adapted to influence spatial-temporal consistency of the at least one of the first and second tracking results.

Embodiments provide such a system in which said first and second features are at least two or more of linear binary patterns, histogram of gradients, histogram of colour, Haar wavelets taken in any and all combinations.

Embodiments provide such a system in which the first and second features are linear binary patters and a histogram of gradients.

Embodiments provide a system as claimed in any preceding claim in which the first tracking results comprise negative tracking results associated with the second object classifier and the second tracking results comprise negative tracking results of the first object classifier.

Embodiments provide such a system wherein the negative tracking results associated with the second object classifier comprise K ranked results and exclude positive tracking results and the negative tracking results associated with the first object classifier comprise K ranked results and exclude positive tracking results.

Embodiments provide such a system in which the first tracking results comprise positive tracking results associated with the first object classifier and the second tracking results comprise positive results associated with the second object classifier.

Embodiments provide at least one of a machine-readable or accessible storage storing machine executable instructions arranged, when executed, to implement the steps of processing a first sample set associated with first results of tracking a target in a number of image frames using a first object classifier arranged to operate according to a first feature and processing a second sample set associated with second results of tracking the target in said number of image frames using a second object classifier arrange to operate according to a second feature, and using at least one of the first and second tracking results to influence at least one particle filter adapted to influence at least one of subsequent first and second tracking results.

Embodiments provide such a machine-readable storage further comprising instructions arranged, when executed, to implement the steps of using at least one of the first and second tracking results to influence at least one particle filter adapted to influence at least one of subsequent first and second tracking results comprises weighting the tracking the at least one of said first and second tracking results.

Embodiments provide such a machine-readable storage wherein said at least one particle filter is adapted to influence spatial-temporal consistency of the at least one of the first and second tracking results.

Embodiments provide such a machine-readable storage wherein said first and second features are at least two or more of linear binary patterns, histogram of gradients, histogram of colour, Haar wavelets taken in any and all combinations.

Referring to FIG. 1, there is shown an image plane 100 containing a detected object 102. In the present embodiment, the detected object is a person, but embodiments are not limited thereto. Embodiments can be realised in which the object of interest is any object, more particularly, any moving object. The detected object 102 is bounded by a bounding box 104. One skilled in the art readily appreciates how such a bounding box 104 can be used to identify a moving object within the image plane 100.

The detected object 102 has a deemed position within the image plane 100. Embodiments of the present invention use the midpoint 106 of the lower edge 108 of the bounding box 104 as the detected object's 102 deemed position or location, known in the art as the footprint, within the image plane 100. Such an approach to determining the deemed position of a detected object 102 within the image plane 100 is particularly useful when the object to be detected is a person. One skilled in the art will realise that other methods of calculating the deemed position of an object within the image plane 100 can also be used, providing that such use is consistent.

Figure 2:
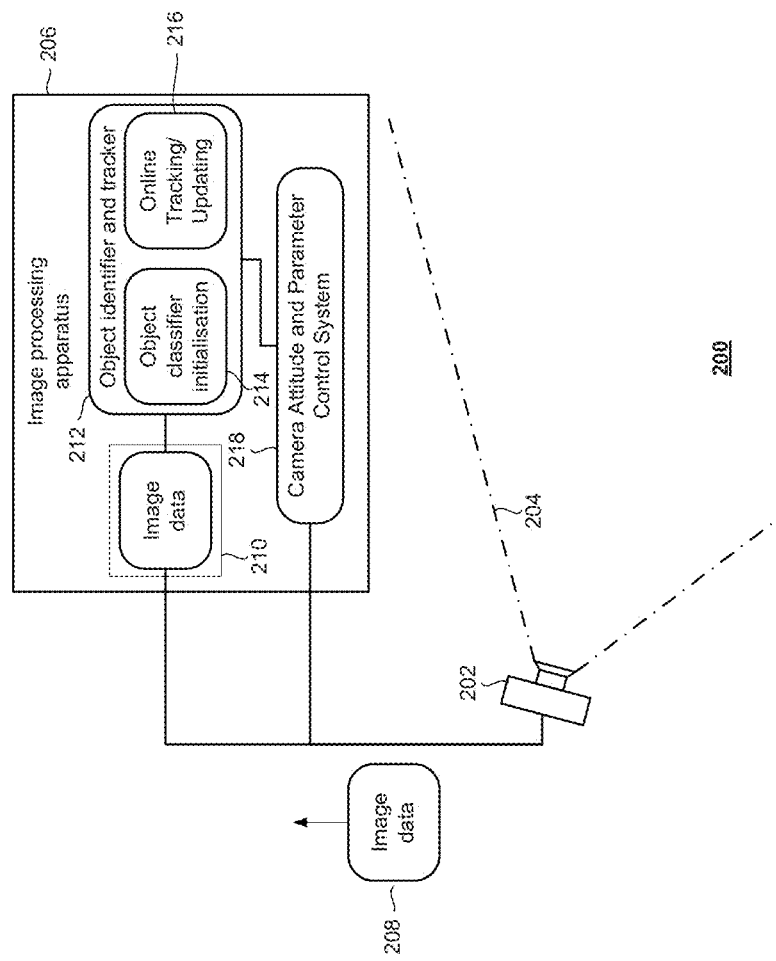
FIG. 2 illustrates a system for object tracking according to an embodiment.

FIG. 2 shows a system 200 comprising a camera 202 that has a corresponding field of view 204. The camera 202 has a corresponding image plane associated with the field of view 204. The camera 202 is calibrated as is well known to those skilled in the art. Although the embodiment depicted uses a single camera, embodiments are not limited to such an arrangement. Embodiments can be realised in which two or some other number or plurality of cameras are used.

The system 200 additionally comprises an image processing apparatus 206 for processing images 208 output from the camera 202. The images 208 are captured and stored using a memory 210. An object identifier and tracker 212 is used to process the images 208 stored in memory with a view to identifying and tracking any objects of interest that are within the field of view 204. The processing undertaken by the object identifier and tracker 212 will be described in greater detail with reference to the remaining figures. The object identifier and tracker 212 comprises two functional aspects, which are, firstly, an object classifier initialisation module 214 and an online object tracking and updating module 216.

Optionally, the image processing apparatus 206 comprises a camera attitude and parameter control system 218 for controlling one or more parameters of the camera 202. For example, aspects that might be controlled comprise the following taken jointly and severally in any and all combinations: camera attitude, aperture, exposure, magnification, focal length and depth of field. The images 208 produced by the camera may comprise at least one of a still or stills, that is, a single frame or multiple stills, or moving images, which are, in fact, multiple frames or multiple stills, that is, video data, or a combination thereof.

Figure 3:
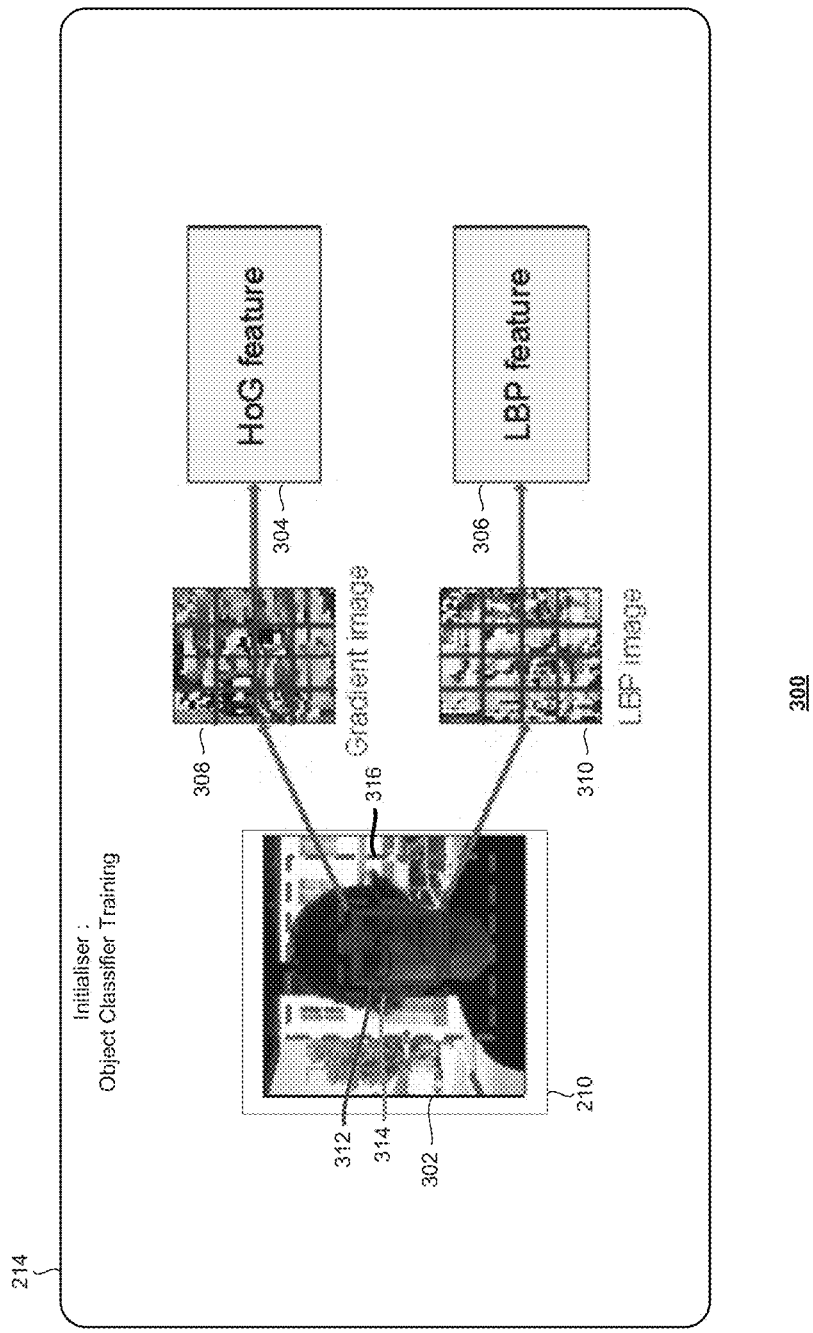
FIG. 3 depicts object classifier training according to an embodiment.

Referring to FIG. 3 there is shown, in greater detail, a view 300 of the object classifier initialisation module 214, or initialiser. The object classifier initialisation module 214 processes training data, in the form of training image data 302, stored in memory 210 or stored or accessible from some other form of storage. Two, preferably conditionally independent first 304 and second 306 features are arranged to process respective instances of image data or samples 308 and 310 derived from or associated with the training image data 302. For example, embodiments use two features that complement each other such as, for example, shape of the tracked target and intensity or texture of the same. In the embodiment illustrated, the first classifier 304/501 is a support vector machine that uses hard training data, in the form of a histogram of gradients feature 308, and the second classifier 308/503 is a support vector machine that uses local binary pattern training data 310 to describe the shape characteristics and intensity distribution of objects of interest in the training image data 302. A support vector machine classifier is a binary classifier that looks for an optimal hyperplane as a decision function. Once trained on images containing some particular object, a support vector machine classifier can make decisions regarding the presence of an object, such as a human being, in further images.

The first 501 and second 503 classifiers will be referred to the HoG training classifier 501 or $SVM_{hog}$ and the LBP training classifier 503 or $SVM_{lbp}$ respectively. One skilled in the art appreciates, however, that visual features other than the histogram of gradients and local binary patterns could be used as the basis for training the first 501 and second 503 classifiers. For example, rectangular filter(s) or Haar wavelets could be used as the basis for training.

The samples 308 and 310 are labeled samples. The labeling can be performed manually or using an accurate detector. When a target object is confirmed, it is identified using a solid rectangle 312. Positive samples are generated from an adjacent or proximate region indicated by a first (inner) dashed rectangle 314. Negative samples are generated from a distal region indicated by the second (outer) dashed region 316. The negative samples exclude the positive samples, that is, even though the proximate region 314 falls wholly within the distal region 316, the negative samples do not contain data relating to or derived from the proximate region 314. At least one of the positive and negative samples is known as training samples. The LBP and HoG features, 304 and 306, are extracted to describe the visual features of the target object. Preferably, embodiments are arranged to take into account partial occlusion of the target object, by determining the structural properties of both features by dividing the object region into M×N grids as illustrated by data 308 and 310. A feature vector of the target object will then be derived from the features vectors of regions of data defined by the M×N grid.

The two SVM classifiers 304/501 and 306/503 are trained using the LBP and HoG features as follows. With labeled target positions, a sample set is processed at time (t−1) as $\{(s_{t-1}^{(n)}, \pi_{t-1}^{(n)}, c_{t-1}^{(n)}), n \in [1, N]\}$, where $c_{t-1}^{(n)}$ indicates the cumulative weights for the $n^{th}$ sample, $\pi_{t-1}^{(n)}$ is the weight of particle n at time (t−1) and the sample vector $s_{t-1}^{(n)} = (C_x, C_y, \delta)$ comprises its centroid position $(C_x, C_y)$ and a scale parameter, $(\delta)$. One skilled in the art appreciates how to vary the scale parameter according to the height and width of a sample set being fixed or variable. Given the possible variation of the object scale parameter in real applications, all sampled particles are normalised before being sent to the classifiers 501 and 503.

Figure 4:
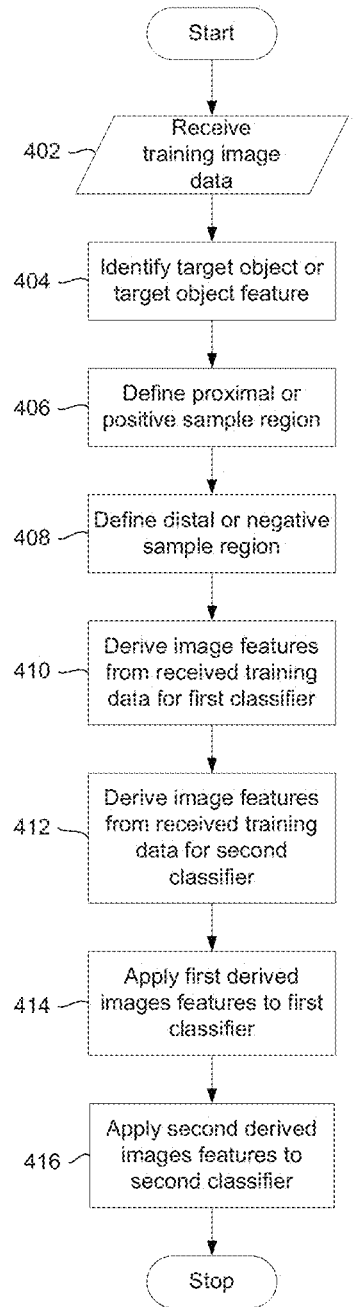
FIG. 4 shows a flowchart for particle filter training according to an embodiment.

FIG. 4 shows a flowchart 400 for initialising or initially training the first 501 and second 503 classifiers using acquired training samples. The training image data 302 is received at step 402. A region of interest or target region of the training image data 302 is identified at step 404. A proximal region or region of positive samples of the training image data is determined at step 406. A distal region or region of negative image samples is determined at step 408. Image features or one or more positive sample vectors are derived from the proximal region at step 410. Image features or one or more negative sample vectors are derived at step 412. The image features or positive sample vectors derived at step 410 are applied to the first classifier at step 414. The image features or negative sample vectors are applied to the second classifier at step 416. In preferred embodiments, the step 410 of deriving image features from the received training data for the first classifier 501 comprises determining a histogram of gradients. In preferred embodiments, the step 412 of deriving image features from the received training data for the second classifier 503 comprises determining local binary patterns. As indicated above, at least one of steps 410 and 412 can be processed or realised using an M×N grid and respective sub-features. The processing shown in FIG. 4 can be repeated for subsequent image data or frames.

Figure 5:
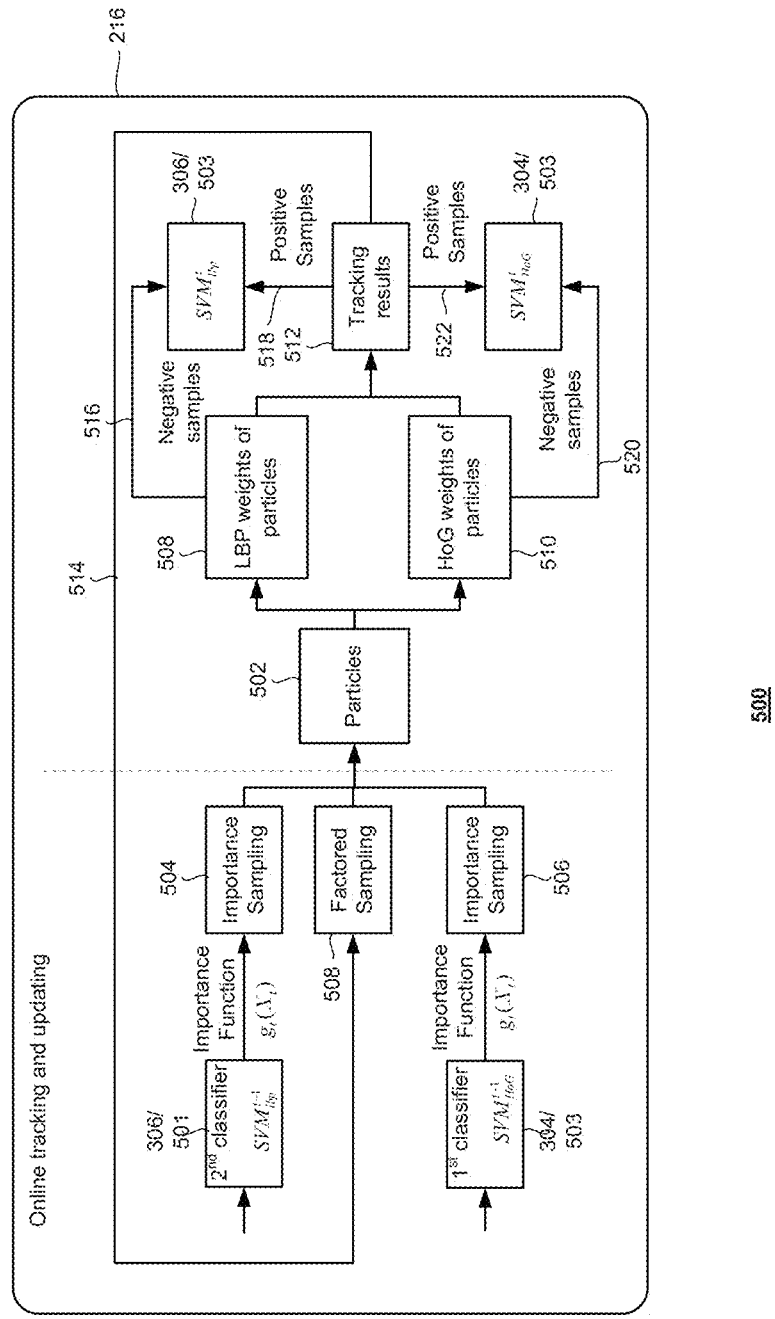
FIG. 5 illustrates online tracking and updating according to an embodiment.

Referring to FIG. 5 there is shown in greater detail a view 500 of the online tracking and updating module 216. The module 216 comprises the two initially trained SVMs 501 and 503 described above with reference to FIGS. 2 to 4. The initially trained SVMs 501 and 503 output samples of or representing respective importance functions, $g_t(X_t)$. One skilled in the art appreciates that a $g_t(X_t)$ is generated by a respective SVM classifier at time t, where $X_t$ represents states such as, for example, x,y coordinates of the target at time t, such that is $g_t(X_t)$ a measure of the confidence that the respective SVM has that $X_t$ is the position of the target, with the resulting effect that more samples will be taken from and near that position and vice versa.

New samples for processing by a particle filter 502 are selected from the outputs of either (a) a pair 504 and 506 of importance sampling units or (b) a factored sampling unit 508. For each particle, $s_t^{(n)}$, n=1 to N, where N is the total number of particles, a uniformly distributed random number, $\epsilon \in [0,1]$ is generated. A ratio control parameter, $\gamma$, is established for controlling the ratio of factored sampling to importance sampling. The ratio control parameter may be determined manually and empirically. Embodiments of the present invention use $\gamma$=0.5. If $\epsilon \leq \gamma$, the particle filter 502 is arranged to use the factored sampling to generate a new sample set, $s_{t-1}^{(n)} = As'_{t(n)} + Bw_t^{(n)}$, based on sample $s'_t^{(n)}$ which is the result from weighted samples, $s_{t-1}^{(n)}$, in a previous frame at a previous time, which is (t−1) in the present embodiment, according to sample weight $\pi_{t-1}^{(n)}$ where A and B are a deterministic matrix and a random matrix of a dynamic model, $w_t^{(n)}$ is zero-mean Gaussian noise. An importance correction factor, $\lambda_t^{(n)}$, is set as $\lambda_t^{(n)}$=1. One skilled in the art appreciates how A and B depend upon the kind of dynamic model chosen for the target, which is usually a $2^{nd}$ order process expressible as $x_t = a_2 x_{t-2} + a_1 x_{t-1} + bw_t$. However, if $\epsilon > \gamma$, the particle filter 502 is arranged to use the importance sampling, such that $s_t^{(n)}$ is chosen from $g_t(X_t)$ and the importance correction factor is set as follows:

$$\lambda_t^{(n)} = f_t(s_t^{(n)})/g_t(s_t^{(n)}), \text{ where}$$

$$f_t(s_t^{(n)}) = \sum_{j=1}^{N} \pi_{t-1}^{(j)} p(X_t = s_t^{(n)} | X_{t-1} = s_{t-1}^{(n)}),$$

where $\pi_{t-1}^{(j)}$ is the weight of particle j at time (t−1) and $p(X_t = s_t^{(n)} | X_{t-1} = s_{t-1}^{(n)})$ is the posterior, that is, the conditional probability that $X_t = s_t^{(n)}$ given that $X_{t-1} = s_t^{(n)}$ as will be appreciated by one skilled in the art from, for example, Isard, M., Visual Motion Analysis by Probabilistic Propagation of Conditional Density, Oxford, Oxford University, which is incorporated herein for all purposes by reference.

The weightings of the newly generated samples or particles are determined by respective weighting determination units 508 and 510. First weighting determination unit 508 determines the LBP weightings for the particles $s_t^{(n)}$. Second weighting determination unit 510 determines the histogram of gradients weightings for the particle $s_t^{(n)}$. In greater detail, the first unit 508 extracts the LBP feature of $s_t^{(n)}$ and calculates the sample weightings regarding the LBP feature using $SVM_{lbp}$ and $$p_{lbp}^{(n)} = \frac{1}{1 + e^{(-d_{lbp})}},$$

where $d_{lbp}$ is a measure of the distance to a separate respective hyperplane. Similarly, the second unit 510 extracts the histogram of gradients feature of $s_t^{(n)}$ using $SVM_{HoG}$ and $$p_{lbp} = \frac{1}{1 + e^{(-d_{HoG})}},$$

where $d_{HoG}$ is a measure of the distance to a separate respective hyperplane. The final weights are obtained by calculating $\pi_t^{(n)} = p(z_t^{(n)}|s_t^{(n)}) = \lambda_t^{(n)}(\alpha_{lbp} p_{lbp}^{(n)} + \alpha_{HoG} p_{HoG}^{(n)})$, where $\alpha_{lbp}$ and $\alpha_{Hog}$ are the confidences for the object classifiers 306 and 304 respectively. The values of $\alpha_{lbp}$ and $\alpha_{HoG}$ can be determined empirically or evaluated by a validation set as can be appreciated from, for example, Tang, F., Brennan, S., Zhao, Q., Tao, H., "Co-tracking using semi-supervised support vector machines", Proc. ICCV 2007, 1-8 (2007), which is incorporated herein by reference for all purposes.

A tracking results unit 512 is arranged to process the outputs of the weightings determination units 508 and 510 with a view to producing a final or new state or position vector, $\hat{x}_t$, at time t, given by $$\hat{x}_t = \frac{\sum_{i=1}^{N} \pi_t^{(i)} s_t^{(i)}}{\sum_{i=1}^{N} \pi_t^{(i)}}.$$

The final or new state vector, $\hat{x}_t$, can be used in the conventional manner to centre a border around the tracked feature, assuming that a graphical output on an image plane is required. Alternatively, the output vector can be used to control equipment according to tracking needs. For example, the output vector, $\hat{x}_t$, can be used to control the camera attitude and control parameter control system to maintain the tracked object within the field of view 204 of the camera 202. Alternatively, or additionally, the output vector can be used for some other purpose.

Embodiments of the present invention use the output vector, $\hat{x}_t$, in a feedback manner via feedback path 514 to form the input to the factored sampling unit 508 in a next frame, which, in embodiments of the present invention, is the frame at time (t+1) for processing as described above. $\hat{x}_t$ represents the state of the target at time t. For example, $\hat{x}_t$ might comprises position coordinates such as (x, y) coordinates and a scale in a manner similar to, for example, $s_{t-1}^{(n)} = (C_x, C_y, \delta)$ described above.

The tracking results unit 512 is adapted to output the tracking results as positive samples for both classifiers 501 and 503. Similarly, the weightings determination units 508 and 510 are arranged to output negative samples for updating $SVM_{lbp}^t$ 503 and $SVM_{HoG}^t$ 501 respectively. One skilled in the art will appreciate that the structure of the online tracking and updating module 216 does not physically contain two instances of an LBP SVM. Similarly, the module 216 does not contain two instances of a HoG SVM. FIG. 5 depicts two instances of the SVMs for the sake of clarity. A practical realisation of embodiments of the present invention would use the paths 516 and 518 for the negative and positive samples as feedback paths that would be coupled as inputs to the $SVM_{lbp}^{t-1}$ 503. Similarly, output paths 520 and 522 would form feedback paths to carry the negative and positive samples as inputs to the $SVM_{HoG}^{t-1}$ 501. The first and second object classifiers 501 and 503 are updated according to the following. If the observation distribution, $p(z_t|\hat{x}_t) \leq T_h$, that is, if the confidence of the tracking results is less than a predefined update threshold, $T_h$, then updating of the object classifiers 304/501 and 306/503 is not performed. One skilled in the art appreciates that $T_h$ is empirically determined. The value or values of $T_h$ vary with the type of classifier used. Embodiments of the present invention can use $T_h = 0.5$. However, if $p(z_t|\hat{x}_t) \leq T_h$, then the object classifiers are updated as follows (a) the tracking results, which sample values taken from the current image at position $\hat{x}_t$, are used as positive samples for both classifiers 304/501 and 306/503; $\hat{x}_t$ gives the state of target at this time, it contains x, y coordinates and scale in a manner similar to $s_{t-1}^{(n)} = (C_x, C_y, \delta)$, (b) the K top-ranked samples, excluding positive samples, of one classifier are used as the negative samples for the another classifier, eg the K top-ranked samples of $SVM_{LPB}$, excluding those that overlap with the positive samples, that is the tracking result, are used to update $SVM_{HoG}$ and visa versa, and (c) the classifiers are updated using incremental/decremental learning such as described in, for example, Cauwenberghs, G., and Poggio, T., "Incremental and decremental support vector machine learning," Advances in Neural Information Processing Systems, NIPS, 409-415 (2000), which is incorporated herein by reference for all purposes. Thereafter, processing continues with the generation and selection of samples according to the importance function and factoring of samples as described above until tracking is terminated. It will be appreciated that "tracking results" means estimated object status in the current frame (after particle sampling and weighting by n classifiers; n is preferably 2, but can be some other value). It is believed to be the best estimation and embodiments, therefore, use it as a positive sample. All other samples can, therefore, be used as negative samples. Furthermore, embodiments use the "top K-ranked" negative sample instead of all samples because the top K-ranked samples are close to the classifier hyperplane, that is, they have associated high confidence but negative values, such that the classifier or classifiers will learn to better distinguish these samples; that is, they are known with a high degree of confidence to relate to image data other than image data containing the target of interest.

Preferred embodiments use a value of K=20. One skilled in the art appreciates that too small a value of K will lead to inadequate training whereas too large a value of K will lead to an inappropriate imbalance between the positive and negative samples. Embodiments are not limited to using the top K-ranked results. Embodiments can be realised in which some other technique is used for selecting samples that are known with a high degree of confidence to be negative samples.

One skilled in the art will appreciate that the incremental/decremental support vector machine is a learning method that is based on the principle of structural risk minimisation, which can be transformed into solving quadratic programming problems to obtain the optimal separating hyperplane. A discriminant function, expressed as $f(x) = w \cdot \phi(x) + b$, is used in which $\phi(x)$ maps non-separable input data in low-dimensional space to high-dimensional separable space. To compute the optimal separating hyperplane, a quadratic programming problem in a number of coefficients equal to the number of training samples needs to be solved as is well known to those skilled in the art.

Figure 6:
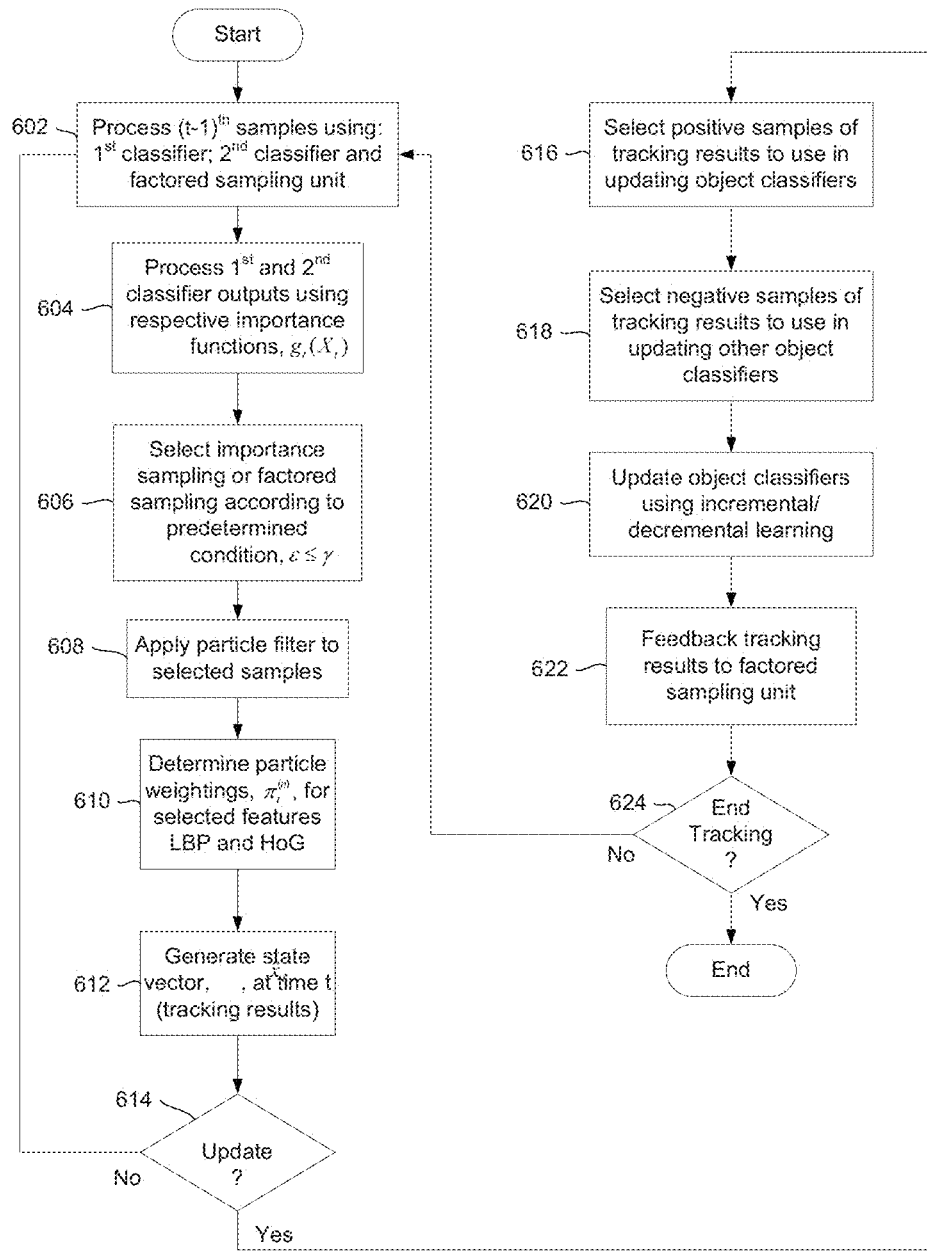
FIG. 6 shows a flowchart of processing for online tracking and updating according to an embodiment.

Referring to FIG. 6, there is shown a flowchart 600 for object tracking according to an embodiment. At step 602, the previously determined final state vector or sample is processed by at least one of the object classifiers and the factoring sampling unit. The outputs of the first 501 and second 503 object classifiers are processed using respective importance functions at step 604. A selection is made at step 606 to determine which samples will be applied to the particle filter;

the importance function samples or the factored samples. The selection is influenced by the ratio control parameter, γ, and an associated condition as previously described. The selected samples are applied to the particle filter at step 608. Step 610 determines the weightings for the selected object features. According to the present embodiment, the weightings relate to the LBP and HoG. The object state vector, $\hat{x}_t$, is determined at step 612. The object state vector can be output for further processing. A determination is made at step 614 regarding whether or not at least one of the first 501 and second 503 object classifiers should be updated. If the determination is negative, processing resumes at step 602. If the determination is positive, processing passes to step 616, where the tracking results are selected as positive samples and, at step 618, selected negative samples are chosen to be used in updating both object classifier 501 and 503. Step 620 updates the first 501 and second 503 object classifiers using incremental/decrements SVM learning. At determination is made at step 622 regarding whether or not object tracking should be terminated. If the determination is negative processing continues at step 602. If the determination is positive, object tracking is terminated.

One skilled in the art will appreciate that the performance of object tracking according to embodiments of the present invention may be attributable, at least in part, to updating of the object classifiers using different data. In the above described embodiments, one object classifier is updated using negative samples which are different for another classifier to classify. The result is that one object classifier may have improved or better discrimination as compared to another the other classifier in some circumstances and vice versa.

Figure 7:
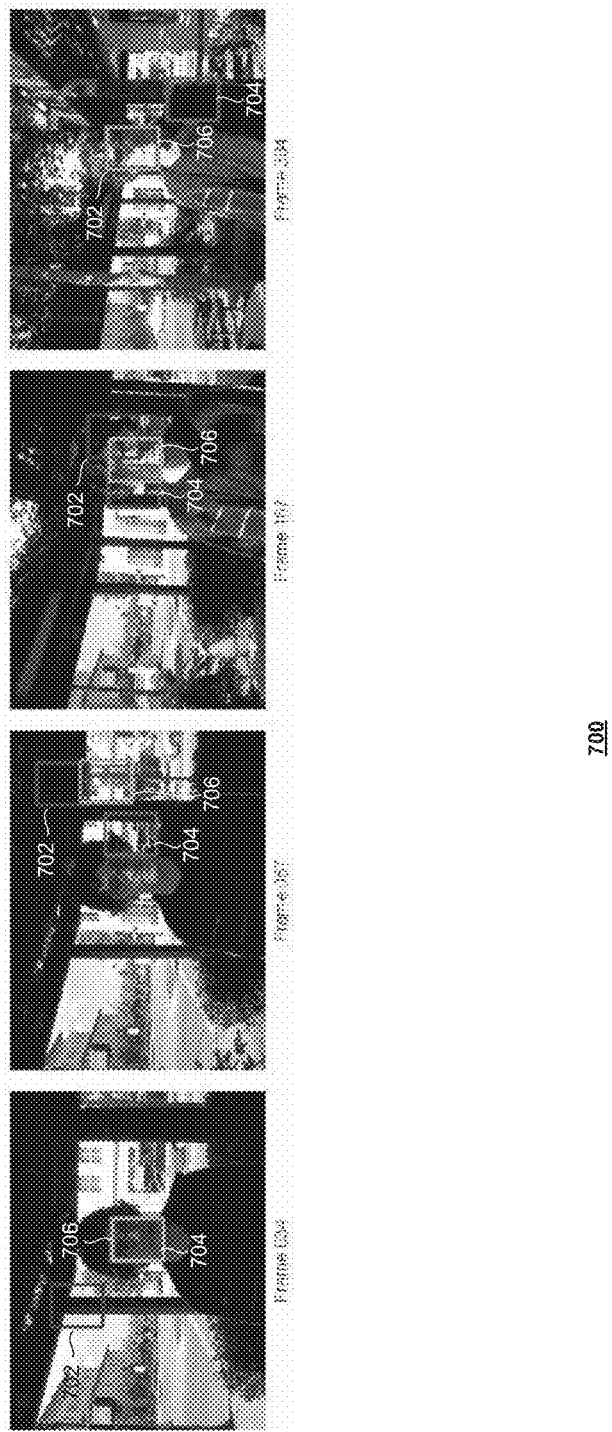
FIG. 7 shows a plurality of images depicting the tracking results based on Trellis70 without classifier updating.

Embodiments of the present invention were tested using the Trellis70 and Car4 benchmark data sets, as are well-known from, for example, Ross, D., Lim, J., Lin, R. S., and Yang, M. H., "Incremental learning for robust visual tracking," International Journal of Computer Vision 77, 125-141 (2007), which is incorporated herein by reference for all purposes. FIG. 7 shows a plurality of images 700 depicting tracking results based on the Trellis70 without classifier updating. The rectangles labeled 702 identify tracking results associated with the HoG classifier, the rectangles labeled 704 identify tracking results associated with the LBP classifier and the rectangles labeled 706 identify the tracking results that stem from combining the two foregoing results. As one skilled in the art will appreciate, since no knowledge is learned during the tracking process, tracking failure frequently occurs. However, while the method of combining the two cues improves matters, the tracking still performs poorly under conditions of significant illumination changes as can be appreciated from, for example, frame 067. It should be noted that the two different features, HoG and LBP, selected as the basis for tracking exhibit a complementary tracking ability. For example, in frames 034 and 384, while one feature fails the other works well.

Figure 8:
FIG. 8 depicts a pair of video images showing tracking results for online updating of classifiers and results according to embodiments of the present invention.

FIG. 8 depicts a pair 800 of video images showing tracking results for online updating of classifiers and tracking results according to embodiments of the present invention. The rectangles labeled 802 show the results of HoG classifier based tracking. The rectangles labeled 804 show the results of the LBP classifier based tracking and the rectangles labeled 806 show the results of tracking according to embodiments of the present invention. Regarding the single cue tracking, that is, the rectangles labeled 802 and 804, it can be appreciated that they are sensitive to singular points and readily drift with appearance changes due to their one-sided observations and error accumulation during self-training. In contrast, embodiments of the present invention give reliable results over the whole test data video sequence.

Figure 9:
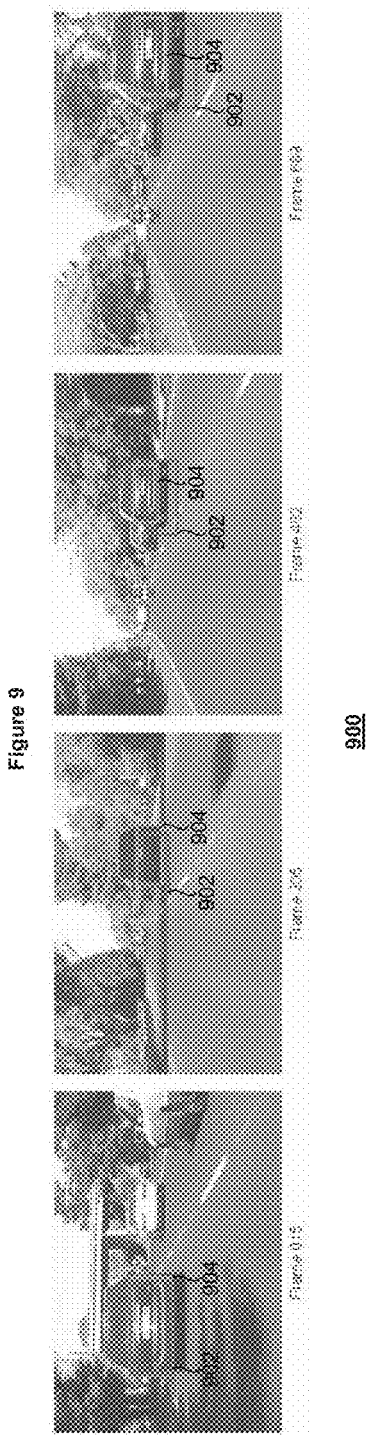
FIG. 9 shows a video sequence illustrating tracking results according to a single support vector machine based on both linear binary patterns and histogram of gradients features.

FIG. 9 shows a video sequence 900 illustrating tracking results according to a single SVM based on both LBP and HoG together, as identified using the rectangles labeled 902, and tracking results according to embodiments of the present invention, as identified using the rectangles labeled 904. In was noted that during the first half of the data, tracking based on the single SVM drifted a little from the true position. Since the drifting samples were added to the classifier as positive samples, the tracking results progressively deviated from the true position, which is a typical example of the drifting problem caused by self-training. In contrast, it can be appreciated that embodiments of the present invention performed very well.

FIG. 10 depicts a pair of graphs 1000 showing quantitative comparisons between embodiments of the present invention and two self-training methods using the Trellis70 and Car4 benchmarks. It can be appreciated that embodiments of the present invention out-perform the two self-training methods based on a single feature. Furthermore, embodiments of the present invention out-perform an online updated single SVM using both LBP and HoG features. FIG. 11 shows the mean absolute error and standard error for the distance values from tracked objects to the manually labeled ground truth.

Figure 12:
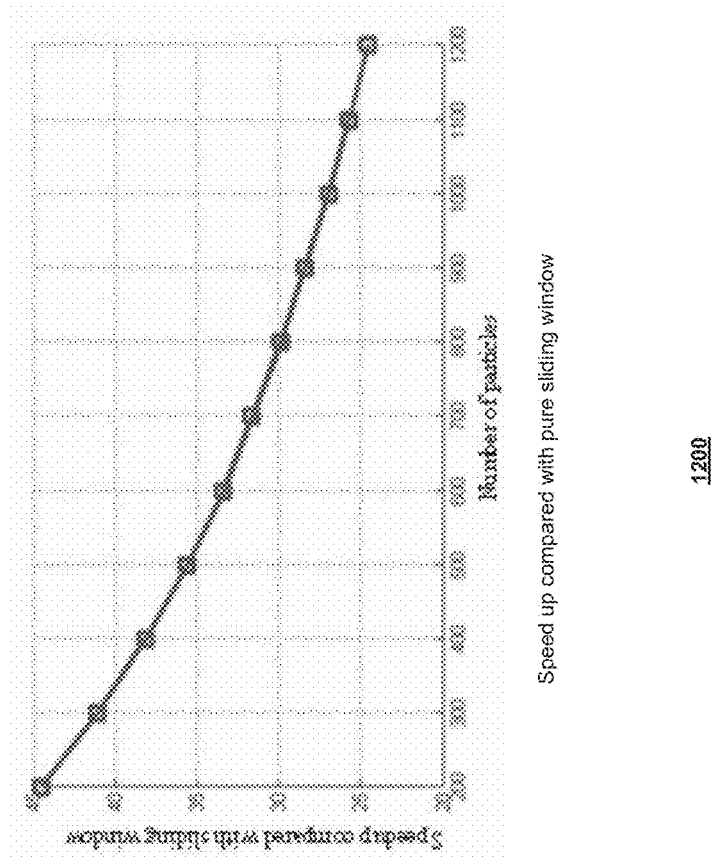
FIG. 12 shows a graph depicting the improvement in speed of processing according to embodiments of the present invention as compared to the prior art.

FIG. 12 shows a graph 1200 depicting the improvement in speed of processing according to embodiments of the present invention as compared to the prior art. It can be appreciated that embodiments of the present invention exhibit, in addition to robustness in the face of appearance variations, an efficiency improvement. Prior art techniques have to search the whole image with all possible object scaling by a sliding window. This is a computationally expensive step to undertake. In contrast, embodiments of the present invention use spatial-temporal consistency within the context of a dynamic model embedded in a particle filter framework. Embodiments of the present invention exhibit a substantial efficiency improvement without loss of accuracy. As can be appreciated from FIG. 12, as compared with a sliding window technique, such as disclosed in, for example, Tang, F., Brennan, S., Zhao, Q., Tao, H., "Co-tracking using semi-supervised support vector machines," Proc. ICCV 2007, 1-8 (2007), embodiments of the present invention are 25 to 45 times faster. A factor in the improvement in speed may be related to the number of particles used. The accuracy of the results improves as more particles are used. Embodiments of the present invention that used between 600 and 1000 particles performed very well.

Although embodiments of the invention have been described with reference to using two classifiers and/or two training classifiers, embodiments are not limited thereto. Embodiments can be realised in which more than two classifiers and/or training classifiers are used.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed by a processor, implement embodiments of the present invention. Accordingly, embodiments provide a program comprising code for implementing a system, device, apparatus, or part thereof, or method as described herein or as claimed herein and machine readable or machine accessible storage storing such a program.

Advantageously, embodiments of the present invention support multiple classifiers working in a coordinated manner and online to improve discrimination performance. The online updated or updating classifiers are embedded into the particle filters to make the tracking adaptive to appearance changes. The particle filter integrates different visual features and spatial-temporal constrains to obtain robust and efficient tracking results, which, in turn, provide accurate positive samples and informative negative samples for updating the classifiers.

The invention claimed is:

1. A data processing method comprising:
processing, in a system having a processor, a first sample set associated with first results of tracking a target in a number of image frames using a first object classifier arranged to operate according to a first feature;
processing, in the system, a second sample set associated with second results of tracking the target in said number of image frames using a second object classifier arrange to operate according to a second feature;
using, in the system, at least one of the first and second tracking results to influence at least one particle filter configured to influence at least one of subsequent first and second tracking results;
generating, by the at least one particle filter, a new sample set of samples;
computing sample weightings based on features of the samples in the new sample set;
producing, based on the sample weightings, position information representing a coordinate of the target; and
updating the first and second object classifiers using the position information.

2. A method as claimed in claim 1, wherein said at least one particle filter influences spatial-temporal consistency of the at least one of the subsequent first and second tracking results.

3. A method as claimed in claim 1, wherein the first tracking results comprise negative tracking results associated with the second object classifier and the second tracking results comprise negative tracking results associated with the first object classifier.

4. A method as claimed in claim 3, wherein the negative tracking results associated with the second object classifier comprise K ranked results and exclude positive tracking results, and the negative tracking results associated with the first object classifier comprise K ranked results and exclude positive tracking results.

5. A method as claimed in claim 1, wherein the first tracking results comprise positive tracking results associated with the first object classifier, and the second tracking results comprise positive tracking results associated with the second object classifier.

6. A method as claimed in claim 1, further comprising:
producing, by said first object classifier, a first function representing a confidence of said first object classifier that a particular coordinate is a position of the target; and
producing, by said second object classifier, a second function representing a confidence of said second object classifier that the particular coordinate is the position of the target.

7. A method as claimed in claim 6, wherein the at least one particle filter produces an output based on the first and second functions.

8. A method as claimed in claim 1, further comprising:
centering, using the position information, a border around the target displayed in a graphical output.

9. A method as claimed in claim 1, further comprising:
controlling, using the position information, movement of a camera to maintain the target in a field of view of the camera.

10. A method as claimed in claim 1, wherein the first feature is a histogram of gradients feature.

11. A method as claimed in claim 10, wherein the second feature is a local binary pattern feature.

12. A data processing system comprising:
a non-transitory machine-readable storage storing a first object classifier and a second object classifier,
said first object classifier executable to process a first sample set associated with first results of tracking a target in a number of image frames, said first object classifier being arranged to operate according to a first feature, said second object classifier executable to process a second sample set associated with second results of tracking the target in said number of image frames, said second object classifier being arrange to operate according to a second feature;
at least one particle filter responsive to outputs of said first and second object classifiers to produce an output to influence at least one of subsequent first and second tracking results, the output including a new sample set of samples;
weighting determination units to compute sample weightings based on features of the samples in the new sample set; and
a tracking results unit to produce, based on the sample weightings, position information representing a coordinate of the target,
wherein the first and second object classifiers are to be modified using feedback from the tracking results unit, the feedback including the position information.

13. A system as claimed in claim 12, wherein said at least one particle filter is to influence spatial-temporal consistency of the at least one of the subsequent first and second tracking results.

14. A system as claimed in claim 12, wherein the first tracking results comprise negative tracking results associated with the second object classifier, and the second tracking results comprise negative tracking results associated with the first object classifier.

15. A system as claimed in claim 14, wherein the negative tracking results associated with the second object classifier comprise K ranked results and exclude positive tracking results, and the negative tracking results associated with the first object classifier comprise K ranked results and exclude positive tracking results.

16. A system as claimed in claim 12, comprising an image processing apparatus to center, using the position information, a border around the target displayed in a graphical output.

17. A system as claimed in claim 12, further comprising:
a control system to control, using the position information, movement of a camera to maintain the target in a field of view of the camera.

18. A non-transitory machine-readable storage storing machine executable instructions arranged, when executed, cause a system having a processor to:
process a first sample set associated with first results of tracking a target in a number of image frames using a first object classifier arranged to operate according to a first feature;

process a second sample set associated with second results of tracking the target in said number of image frames using a second object classifier arrange to operate according to a second feature;

use at least one of the first and second tracking results to influence at least one particle filter adapted to influence at least one of subsequent first and second tracking results;

generate, by the at least one particle filter, a new sample set of samples;

compute sample weightings based on features of the samples in the new sample set;

produce, based on the sample weightings, position information representing a coordinate of the target; and update the first and second object classifiers using feedback that includes the position information.

19. Machine-readable storage as claimed in claim 18, wherein said at least one particle filter is to influence spatial-temporal consistency of the at least one of the subsequent first and second tracking results.

20. Machine-readable storage as claimed in claim 18, wherein the instructions when executed are to further:
  center, using the position information, a border around the target displayed in a graphical output.

21. Machine-readable storage as claimed in claim 18, wherein the instructions when executed are to further:
  control, using the position information, movement of a camera to maintain the target in a field of view of the camera.

22. Machine-readable storage as claimed in claim 18, wherein the first feature is a local binary pattern feature.

23. Machine-readable storage as claimed in claim 22, wherein the second feature is a histogram of gradients feature.

* * * * *

UNITED STATES PATENT AND TRADEMARK OFFICE
CERTIFICATE OF CORRECTION

PATENT NO.        : 8,600,108 B2
APPLICATION NO.   : 13/258495
DATED             : December 3, 2013
INVENTOR(S)       : Liang Tang et al.

It is certified that error appears in the above-identified patent and that said Letters Patent is hereby corrected as shown below:

On the Title page, in Item (73), Assignee, in column 1, line 2, delete "Compant," and insert -- Company, --, therefor.

Signed and Sealed this
Twenty-seventh Day of May, 2014

Michelle K. Lee
*Deputy Director of the United States Patent and Trademark Office*